(12) United States Patent
Croft (10) Patent No.: US 10,688,387 B2
(45) Date of Patent: Jun. 23, 2020

(54) ARTICULATED GAMING CONTROLLER

(71) Applicant: Box Dark Industries Pty. Ltd., Brisbane (AU)

(72) Inventor: Phillip Raymond Croft, Brisbane (AU)

(73) Assignee: Box Dark Industries Pty. Ltd., Brisbane (AU)

( * ) Notice: Subject to any disclaimer, the term of this patent is extended or adjusted under 35 U.S.C. 154(b) by 0 days.

(21) Appl. No.: 16/078,839

(22) PCT Filed: Feb. 24, 2017

(86) PCT No.: PCT/AU2017/050165
§ 371 (c)(1),
(2) Date: Aug. 22, 2018

(87) PCT Pub. No.: WO2017/143404
PCT Pub. Date: Aug. 31, 2017

(65) Prior Publication Data
US 2019/0022522 A1 Jan. 24, 2019

(30) Foreign Application Priority Data

Feb. 25, 2016 (AU) .................................. 2016900671
Sep. 14, 2016 (AU) .................................. 2016903683

(51) Int. Cl.
*A63F 13/24* (2014.01)
*G06F 3/0338* (2013.01)

(52) U.S. Cl.
CPC ............ *A63F 13/24* (2014.09); *G06F 3/0338* (2013.01)

(58) Field of Classification Search
None
See application file for complete search history.

(56) References Cited

U.S. PATENT DOCUMENTS

| | | | |
|---|---|---|---|
| 3,726,497 A | 4/1973 | Gannett et al. | |
| 5,785,317 A | 7/1998 | Sasaki | |
| 6,544,124 B2 | 4/2003 | Ireland et al. | |
| 6,614,420 B1 | 9/2003 | Han et al. | |
| 7,407,439 B1 * | 8/2008 | Ochoa ..................... | A63F 13/02 463/37 |
| 8,366,549 B2 | 2/2013 | Garcia | |
| 8,505,854 B2 | 8/2013 | Ishiba | |
| 9,539,507 B2 * | 1/2017 | Schoenith ............... | A63F 13/98 |
| 10,232,254 B2 * | 3/2019 | Gassoway ............... | A63F 13/24 |

(Continued)

FOREIGN PATENT DOCUMENTS

JP 847581 A 2/1996
WO 2009143568 A1 12/2009

*Primary Examiner* — Ronald Laneau
(74) *Attorney, Agent, or Firm* — The Webb Law Firm (57) ABSTRACT

An articulated controller is provided that enables a user to simply, and intuitively enter complex movements into a game with high accuracy, and while maintaining a constant grip. The controller comprises: a first hand unit, for being held in one hand by the user; a second hand unit, for being simultaneously held in another hand by the user, and an articulable joint coupling the first hand unit and the second hand unit, wherein the articulable joint is at least partly enclosed by the first hand unit to enable the user to maintain a grip on the first hand unit without interference from the articulable joint, and wherein user input is provided to the controller through movement of the articulable joint.

18 Claims, 5 Drawing Sheets

(56) References Cited

U.S. PATENT DOCUMENTS

| | | | |
|---|---|---|---|
| 10,232,255 B2* | 3/2019 | Gassoway | A63F 13/24 |
| 2005/0181347 A1* | 8/2005 | Barnes | G09B 5/00 |
| | | | 434/350 |
| 2005/0277470 A1 | 12/2005 | Watanachote | |
| 2008/0146336 A1 | 6/2008 | Feldman et al. | |
| 2010/0279773 A1 | 11/2010 | Atzmon | |
| 2011/0118029 A1* | 5/2011 | Lukas | G06F 21/32 |
| | | | 463/37 |
| 2012/0088582 A1* | 4/2012 | Wu | A63F 13/211 |
| | | | 463/37 |
| 2015/0031456 A1 | 1/2015 | Dascher | |

\* cited by examiner

ARTICULATED GAMING CONTROLLER

CROSS-REFERENCE TO RELATED APPLICATIONS

This application is the United States national phase of International Application No. PCT/AU2017/050165 filed Feb. 24, 2017, and claims priority to Australian Patent Application Nos. 2016900671 and 2016903683, filed Feb. 25, 2016 and Sep. 14, 2016, respectively, the disclosures of which are hereby incorporated in their entirety by reference.

TECHNICAL FIELD

The present invention relates to gaming controllers. In particular, the present invention relates to articulated gaming controllers.

BACKGROUND ART

Since the 1980 s, gaming controllers have often been handheld units with buttons and a joystick or joypad. An example of such a gaming controller is the Nintendo Entertainment System (NES) controller, which includes a cross-shaped joypad, two game buttons, and start and select buttons.

Over time, improvements to gaming controllers have been made, including the incorporation of further buttons, more accurate joysticks, and the use of wireless technology (rather than wired controllers).

Modern gaming controllers are generally accurate when mastered, but generally require a lot of practice and skill to master, as the controls are generally not intuitive.

Attempts have been made to make controllers that are more intuitive. For example, steering wheel controllers have been developed, which mimic the steering wheel of a car, as have gun controllers, which mimic guns. Such controllers are, however, only suitable for certain types of games, such as car or shooting games, and as such, generally require the use of different controllers for different games, which is time consuming and expensive.

More recently, attempts have been made to incorporate motion sensors into controllers, to enable more intuitive interaction. However, such controllers are generally not very accurate, and complex interaction is difficult using motion.

Similarly, attempts have been made to provide articulated controllers, however, such controllers of the prior art have been difficult to grip and use, particularly when the user is focusing on a screen.

Accordingly, there is a need for an improving gaming controller.

It will be clearly understood that, if a prior art publication is referred to herein, this reference does not constitute an admission that the publication forms part of the common general knowledge in the art in Australia or in any other country.

SUMMARY OF INVENTION

The present invention is directed to gaming controllers, which may at least partially overcome at least one of the abovementioned disadvantages or provide the consumer with a useful or commercial choice.

With the foregoing in view, the present invention in one form, resides broadly in an articulated controller comprising:

a first hand unit, for being held in one hand by the user;

a second hand unit, for being simultaneously held in another hand by the user, and an articulable joint coupling the first hand unit and the second hand unit, wherein the articulable joint is at least partly enclosed by the first hand unit to enable the user to maintain a grip on the first hand unit without interference from the articulable joint, and wherein user input is provided to the controller through movement of the articulable joint.

Preferably, the controller is a gaming controller.

Preferably, the first and second hand units comprise a left hand unit and a right hand unit.

Preferably, the articulable joint comprises a link, articulated with the first hand unit, and articulated with the second hand unit.

Preferably, the link is elongate. Preferably, the link is articulated with the first hand unit at one end of the link, and articulated with the second hand unit at an opposing end of the link.

Preferably, the first hand unit is pivotally attached to the link, and the second hand unit is pivotally attached to the link.

Preferably, the first and second hand units are configured to pivot around a first axis, and at least one of the first and second hand units is configured to pivot around a second axis. The second axis may be perpendicular to the first axis. The first and second hand units may be configured to pivot around the first axis independently of pivoting around the second axis.

Preferably, the first and second hand units are configured to pivot around an axis of the link unit. Alternatively, the first and second hand units may be configured to pivot around an axis parallel to an axis of the link.

Preferably, the first and second hand units are configured to mimic a twisting motion where first and second hand units are rotated in opposite directions around the axis of the link.

Preferably, the first and second hand units are configured to pivot around ends of the link unit. The first and second hand units may be configured to pivot around axes perpendicular to a front surface of the controller.

Suitably, the first and second hand units are configured to mimic an up-down motion, where the first and second units are raised or lowered relative to each other, such that an angle is varied between the first unit and the link, and between the second unit and the link.

Preferably, the first and second hand units each include a channel, for receiving respective ends of the link.

Preferably, the channels are elongate, and extend along a length of the first and second units.

Preferably, the channels are located on inside faces of each the first and second unit.

Preferably, the controller includes an interface, for communicating signals of the controller to a system to be controlled. The system to be controlled may comprise a personal computer or a video game console, for example.

Preferably, the interface is a wireless interface.

Preferably, the controller includes a sensor, coupled to the interface, the sensor configured to sense relative movement of the first and second hand units. The sensor may be configured to sense relative movement of the first and second hand units by sensing a movement of the first hand unit with reference to the link.

Preferably, the link is configured to maintain the first and second hand units in a parallel arrangement.

Preferably, the link comprises first and second arms, pivotally coupled to the each of the left and right hand units. The first and second arms may be parallel, of equal length, and symmetrically positioned on the first and second units to form a parallelogram with the first and second units. The link may include a cover, covering the first and second arms.

The controller may include one or more springs, configured to bias the articulable joint into a normal state.

Preferably, the controller includes a joypad on an upper portion of a front thereof, which enables the user to input left, right up and down motions.

Preferably, the controller includes one or more buttons on an upper portion of a front thereof, which enables the user to input selections.

Preferably, the controller is substantially symmetrical. Preferably, the link is symmetrical.

Preferably, the controller is entirely handheld.

In another form, the invention resides broadly in an articulated gaming controller comprising:

a first hand unit, for being held in one hand by the user;

a second hand unit, for being simultaneously held in another hand by the user, and an articulable joint coupling the first hand unit and the second hand unit, wherein the first and second hand units are configured to pivot around a first axis and a second axis, and generate output signals according to the pivoting around the first axis and the second axis.

Preferably, a first signal component is generated according to pivoting around the first axis, and a second signal component is generated according to pivoting around the second axis.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
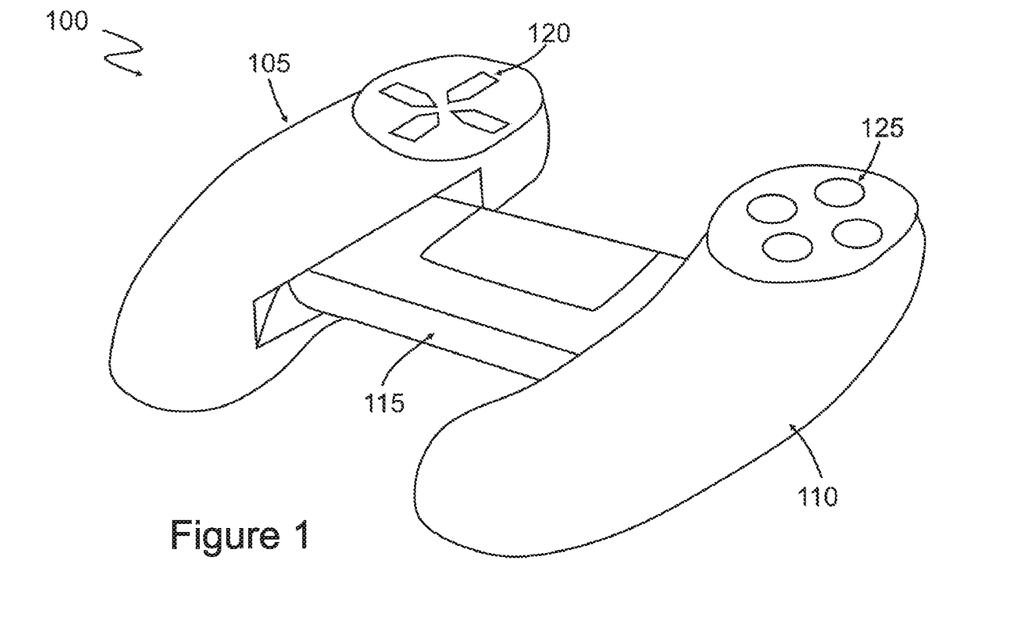
FIG. 1 illustrates an upper perspective view of a controller, according to an embodiment of the present invention.
Figure 2:
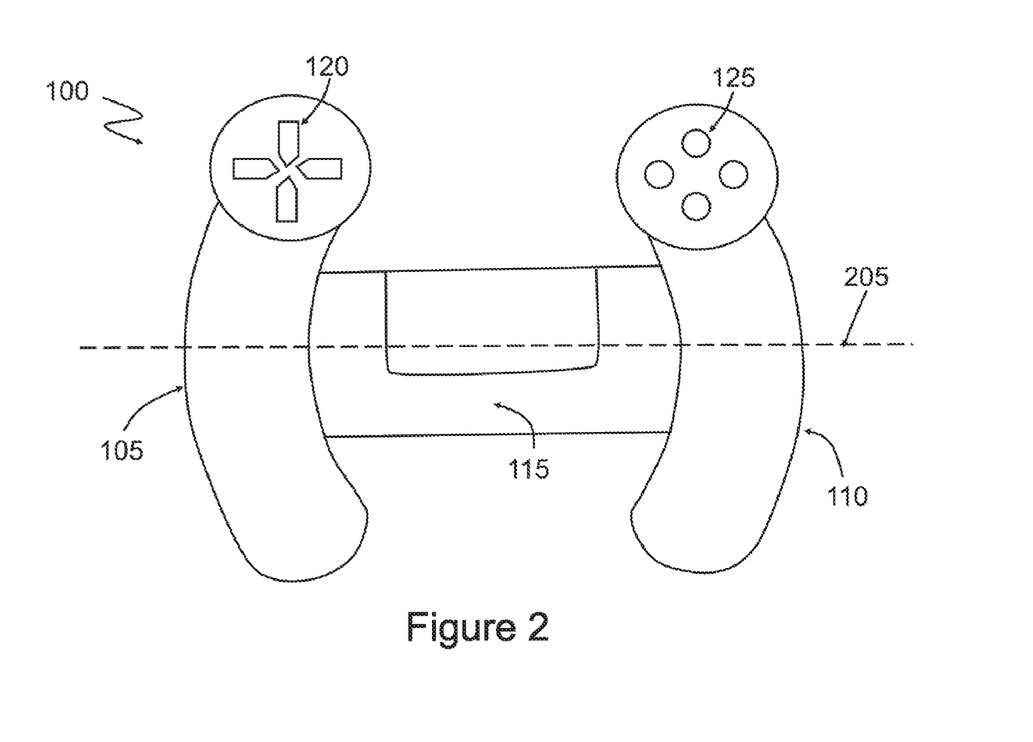
FIG. 2 illustrates a front view of the controller of FIG. 1, according to an embodiment of the present invention.
Figure 3:
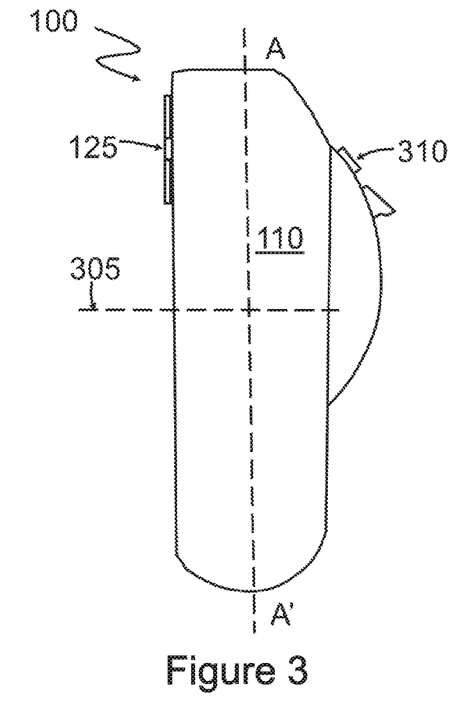
FIG. 3 illustrates a side view of the controller of FIG. 1, according to an embodiment of the present invention.

FIG. 1 illustrates an upper perspective view of an articulate gaming controller 100, according to an embodiment of the present invention. FIG. 2 illustrated a top view of the controller 100, and FIG. 3 illustrates a right side view of the controller 100.

The gaming controller 100 can be used with various types of games, including car games, fighting games, sports games and the like. The controller 100 enables the user to simply, and intuitively enter complex movements into the game with high accuracy, and while maintaining a constant grip.

The gaming controller includes a left hand unit 105, a right hand unit 110, and a link unit 115 connecting the left hand unit 105 and the right hand units 110.

The left hand unit 105 is pivotally attached to the link unit 115, and the right hand unit 105 is pivotally attached to the link unit 115. As such, the controller 100 can be manipulated by pivoting the left and right hand units 105, 110 relative to the link unit.

Figure 4:
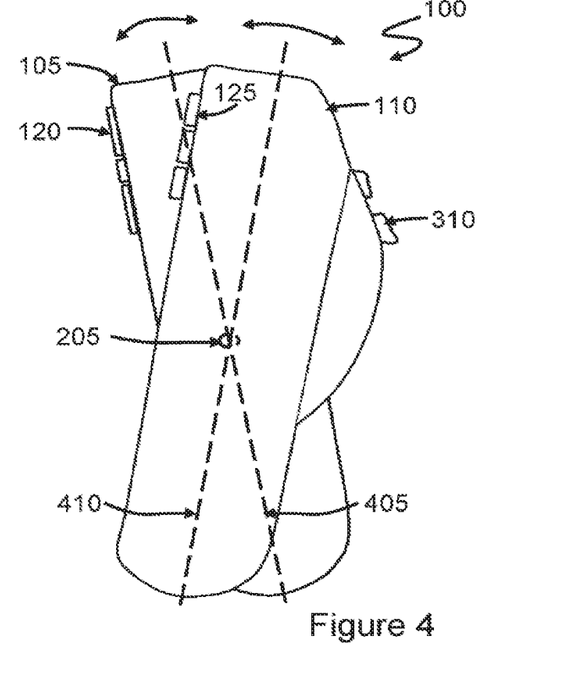
FIG. 4 illustrates a right side view of the controller of FIG. 1 in a first configuration.

As best illustrated in FIG. 4, the left hand unit 105 and the right hand unit 110 are configured to pivot around an axis 205 of the link unit 115, or around an axis parallel to the axis 205 of the link unit 115. As such, the controller 100 can be manipulated through a twisting motion, where the left hand unit 105 and the right hand unit 110 are rotated in opposite directions such that an angle is varied between an axis 405 of the left hand unit 105 and an axis 410 of the right hand unit 110.

Figure 5:
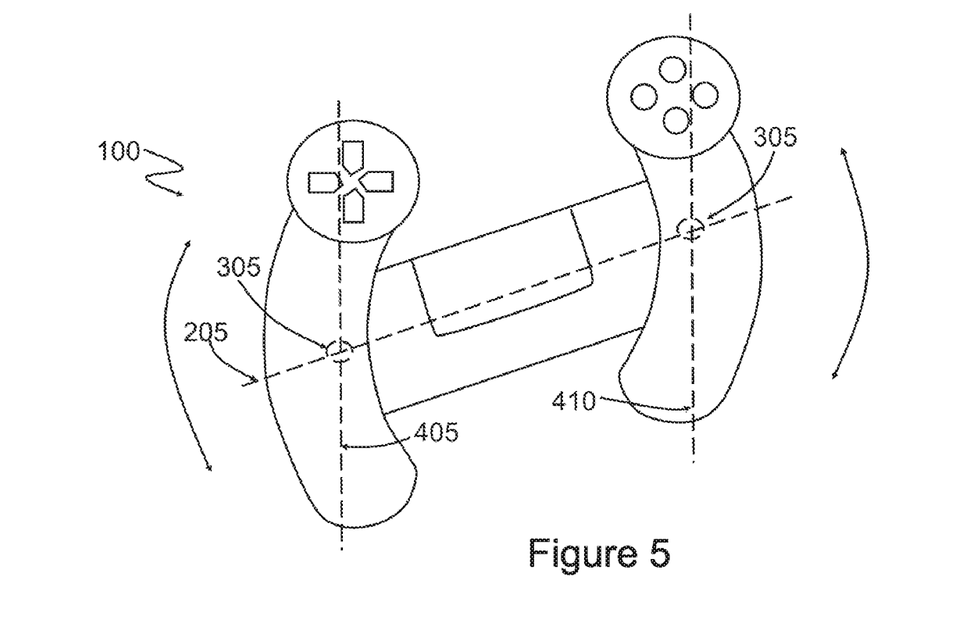
FIG. 5 illustrates a front view of the controller of FIG. 1 in a second configuration.

Similarly, and as best illustrated in FIG. 5, the left hand unit 105 and the right hand unit 110 are configured to pivot around ends of the link unit 115, and around axes 305 perpendicular to a face (front surface) of the controller 100. As such, the controller 100 can be manipulated through an up-down motion, where the left hand unit 105 and the right hand unit 110 are raised or lowered relative to each other, such that an angle is varied between the left hand unit 105 and the link, and between the right hand unit 110 and the link.

As such, the controller 100 can be manipulated through a twisting motion, where the left hand unit 105 and the right hand unit 110 are rotated in opposite directions, and an up-down motion, where the left hand unit 105 and the right hand unit 110 are raised and lowered relative to each other.

Now turning back to FIG. 1 and FIG. 2, the left hand unit 105 includes a joypad 120 on an upper portion of a front thereof, which enables the user to input left, right up and down motions. Similarly, the right hand unit 110 includes a plurality of buttons 125 on an upper portion of a front thereof, which enables the user in input a plurality of commands. Similarly, and as illustrated in FIG. 3, the right hand unit includes rear buttons 310, which enable the user to provide additional input using his or her fingers.

Advantageously, the twisting an up-down motions can be performed easily by users with different hand sizes, without looking at the controller, and without requiring careful positioning of the hands on the controller, in clear contrast to a complex button based system.

Figure 6:
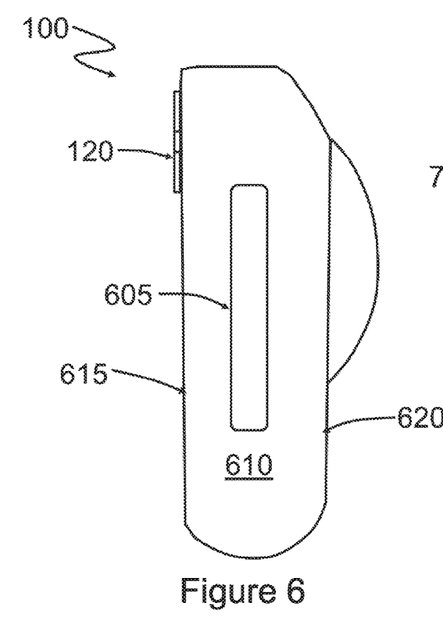
FIG. 6 illustrates a right side view of the controller of FIG. 1, with a right hand unit and link removed.

As best illustrated with reference to FIG. 6, the left hand unit 105 includes a channel 605, in which the link unit 115 is received. The channel 605 is on an inside face 610 of the left hand unit 105, intermediate a front face 615 of the left hand unit 105 and a rear face 620 of the left hand unit 105. As such, pivot joints which enable the pivoting of the left hand unit 105 with reference to the link unit 110 are shielded by the left hand unit from a front of the left hand unit 105 (i.e. by the front face 615), from a rear of the left hand unit 105 (i.e. by the rear face 620).

A mirrored channel arrangement is provided in the right hand controller 110, shielding the link unit 110.

As the link unit 110 is shielded by the front face 615 and the rear face 620 of the left and right hand units 105, the user is able to grip the controller 100, and maintain that grip throughout an entire motion range of the controller. More specifically, the user is able to grip the left hand unit 105 and the right hand unit 110, without interfering with the link, as illustrated by the exemplary hand 705 in FIG. 7.

Figure 7:
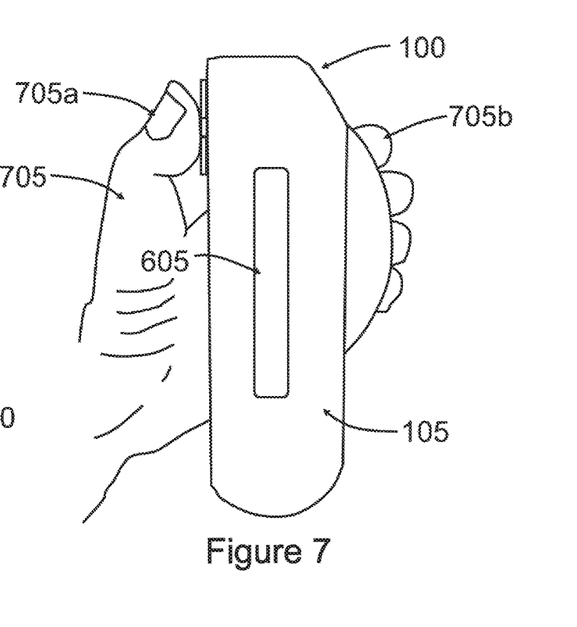
FIG. 7 illustrates a hand grip onto the controller as illustrated in FIG. 6.

This enables the user to place his or her thumb 705*a* and/or fingers 705*b* adjacent to buttons 125, the joypad 120, or any other user input elements that may be present, and maintain that position even while the left and right hand units 105, 110 move relative to each other.

Figure 8:
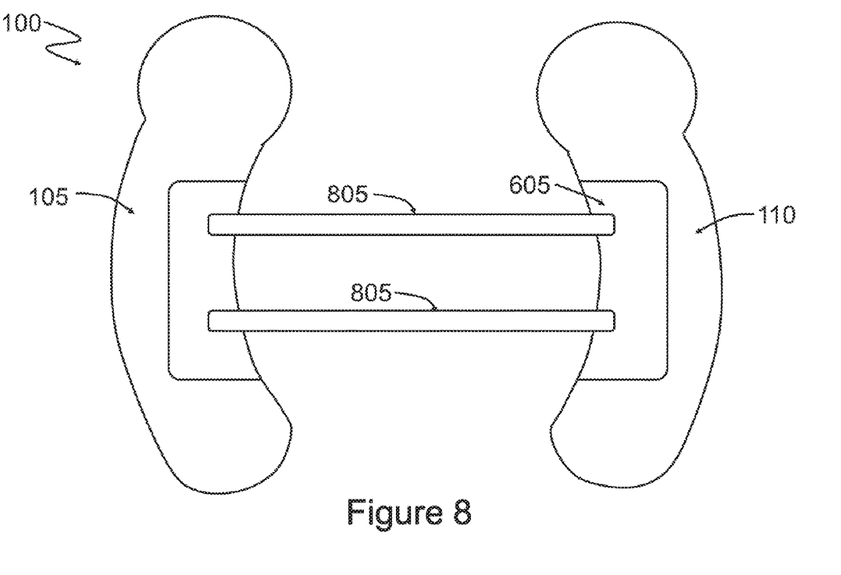
FIG. 8 illustrates a front cross sectional view of the controller along an axis A-A' of FIG. 3.

As illustrated in FIG. 8, the link comprises first and second arms 805, pivotally coupled to the each of the left and right hand units 105, 110. The first and second arms 805 are parallel, and of equal length, and are symmetrically positioned on the left and right units 105, 110. As such, the first and second arms 805 form a parallelogram with the left and right units 105, 110.

The link 115 comprises a cover, which covers the first and second arms and provides the appearance of a single link unit.

According to certain embodiments, the left hand unit 105 is configured to pivot (rotate) around the axis 405 of the left hand unit 105, and/or the right hand unit 110 is configured to pivot around the axis 510 of the right hand unit 110, and generate a signal based thereon. This may be instead of the pivoting of the left and right hand units 105, 110 around one or both of the axes 205, 305, or in addition thereto, so that the left and right hand units 105, 110 may pivot around three axes.

By allowing the left or right hand units 105, 110 to pivot around their own axis, the controller is able to mimic a throttle style input, which is particularly advantageous in motorcycle games.

Figure 9:
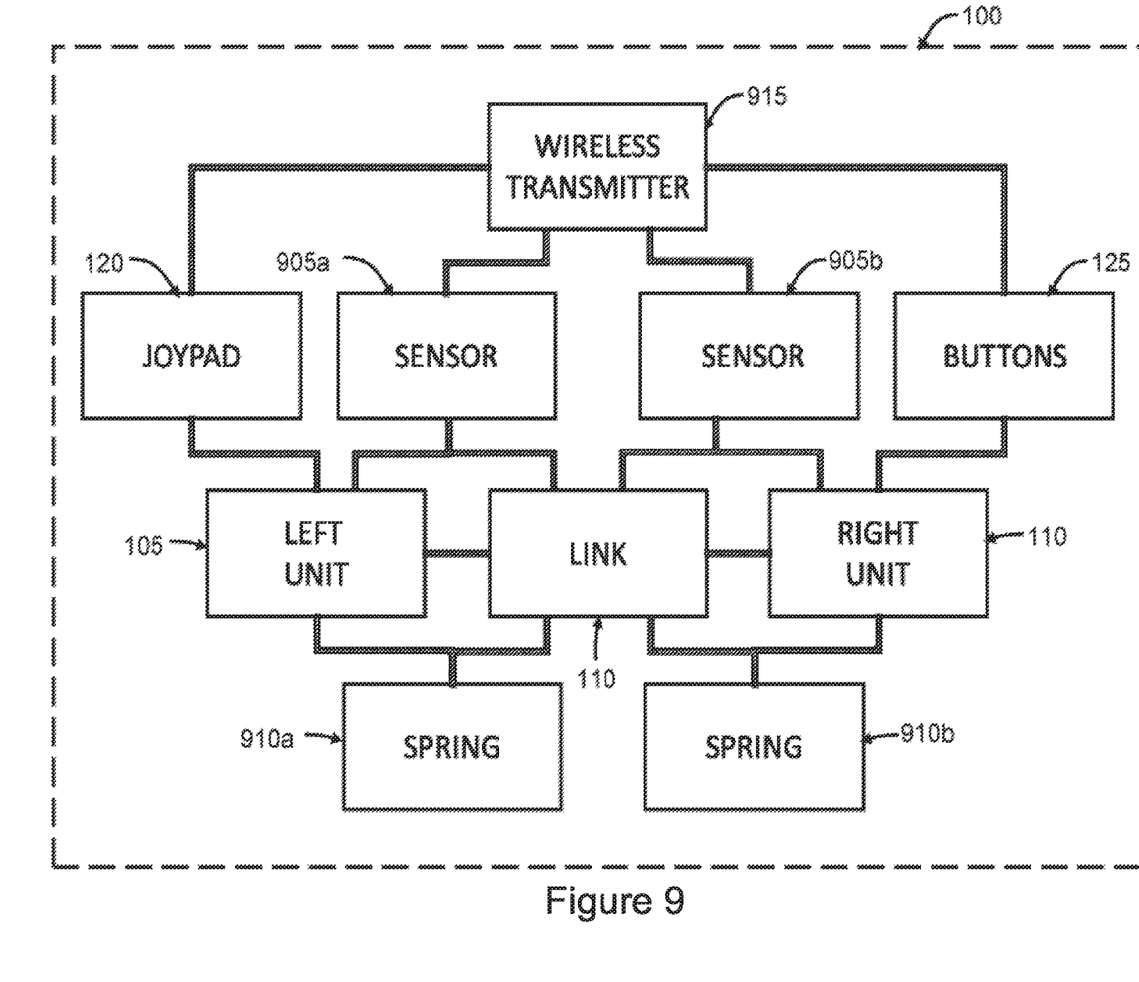
FIG. 9 illustrates a schematic of the controller of FIG. 1, according to an embodiment of the present invention.

FIG. 9 illustrates a schematic of the game controller 100, according to an embodiment of the present invention.

The controller 100 includes sensors 905*a*, 905*b*, coupled to the left unit 105 and link 115, and coupled to the right unit 110 and link 115, for detecting a configuration of the controller. In particular, the sensor 905*a* is configured to detect movement of the left unit 105 relative to the link around two different axes, namely around the axis 205 of the link unit 115, and around an axis 305 perpendicular to a face (front surface) of the controller 100. The sensor 905*b* is for detecting similar movement of the right unit 110.

The controller further includes springs 910*a*, 910*b*, coupled to the left unit 105 and link 115, and coupled to the right unit 110 and link 115, for biasing the controlled towards a neutral configuration (i.e. as illustrated in FIG. 1, where the left unit 105 and right unit 110 are parallel and forming a right angle with the link 115.

As such, the user applies force to the controller 100 (e.g. twisting or relative lateral movement of the left and right units) as user input. When the user ceases to apply such force to the controller 100, the controller automatically returns to the neutral state.

The sensors 905*a*, 905*b* are coupled to a wireless transmitter 915, to enable a signal of the sensors to be provided to a gaming console, a personal computer, or other device. The skilled addressee will, however, readily appreciate that a wired coupling may instead be provided, and/or that the sensor data may be filtered at the controller prior to being sent to the gaming console or similar.

Similarly, the joypad 120 and buttons 125 are also coupled to the wireless transmitter 915. As such, an input to the gaming console or similar device is generally a combination of sensor data and other user input.

As, the left and right units 105, 110 operate symmetrically, the skilled addressee will readily appreciate that sensors 905*a*, 905*b* need not be provided in both the left and right controllers. As illustrated in FIG. 5, as the right unit 110 moves up, the angle with reference to the link 115 increases by the same amount as the angle decreases between the link 115 and the left unit 105. In particular, the sum of both angles is always constant, regardless of position, namely 180 degrees.

Similarly, data from the sensors 905*a*, 905*b* may be filtered to provide a single input value. Finally, the joypad 120, the sensors 905*a*, 905*b* and the buttons 125 are coupled by a single flexible PCB Membrane that extends between the left and right units 105, 110 through the link. As the controller is used, a flexible ribbon component flexes at junctions between the left and right units 105, 110 and the link 115, providing continuity between the sensors and buttons and the wireless interface through all configurations of the controller 100.

While the sensors 905*a*, 905*b* are illustrated as single sensors, the skilled addressee will readily appreciate that each of the sensors 905*a*, 905*b* may comprise two single plane sensors, for detection motion around difference axes separately. Similarly, each sensor 905*a*, 905*b* may comprise multiple redundant sensors.

According to certain embodiments, the wireless transmitter may be housed in the link 115, together with a battery, to provide a balanced unit.

Figure 10:
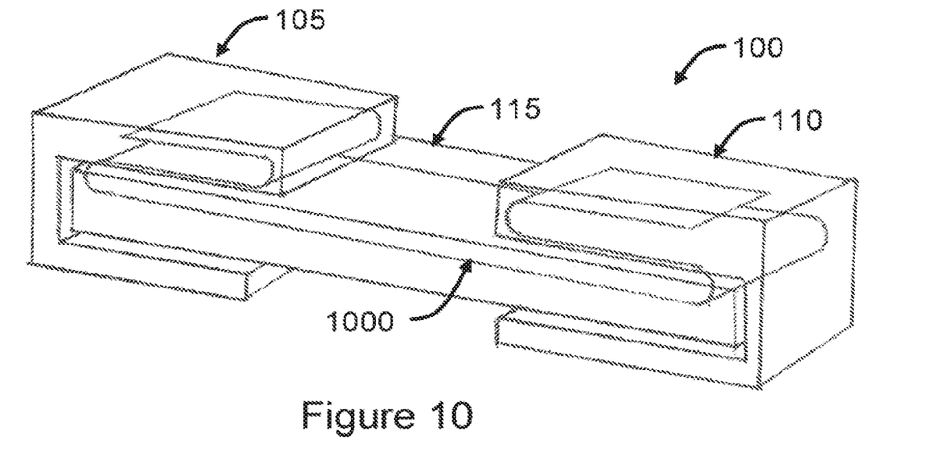
FIG. 10 illustrates a cutaway portion of the controller of FIG. 1, illustrating a flexible PCB membrane, according to an embodiment of the present invention.

FIG. 10 illustrates a cutaway portion of the controller 100, illustrating a flexible PCB membrane 1000, according to an embodiment of the present invention. As previously mentioned, the flexible PCB Membrane 1000 extends between the left and right units 105, 110 through the link 115.

As the PCB membrane 1000 passes through articulating hinges at both ends of the link 115, it is at risk of wearing and becoming damaged. The membrane 1000 passes through the hinges from the link 115 to the two units 105, 110 in an S-bend configuration. This configuration ensures that the membrane has the necessary flexibility so it will not wear like a directly coupled membrane, and thus has a longer working life. Furthermore, the S-bend configuration provides a longer overall membrane when compared with a directly coupled membrane, which helps spread any movement of the membrane over a larger area.

Figure 11:
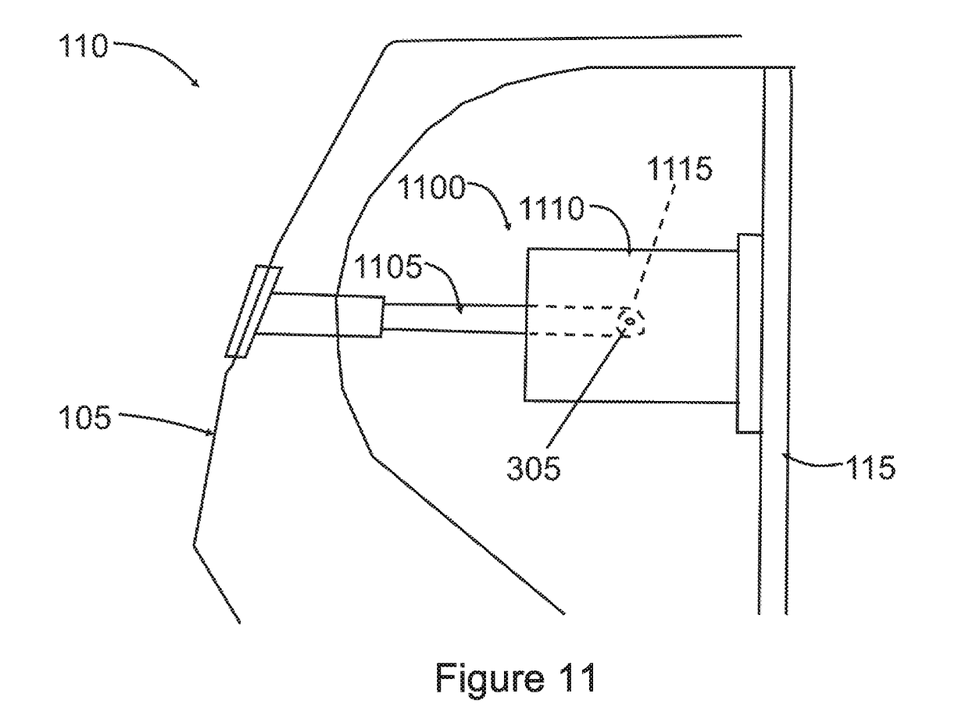
FIG. 11 illustrates a further cutaway portion of the controller of FIG. 1, illustrating a position of a toggle sensor mechanism relative to the left unit and the link.

FIG. 11 illustrates a further cutaway portion of the controller 100, illustrating a position of a toggle sensor mechanism 1100 relative to the left unit 105 and the link 115.

The toggle sensor mechanism 1100 includes an arm 1105, which extends outwardly from a body 1110. An end of the arm 1105 is coupled to the left unit 105, and an opposite end of the body 1110 is coupled to the link 115

The toggle sensor mechanism 1100 is positioned within the hinge so that a rotational axis 1115 of the toggle sensor mechanism 1100 sits directly on the axis 305 of the hinge. This enables the toggle sensor mechanism 1100 to sense articulation of the hinge accurately and without any distortion. In any other position, i.e. when the axes 1115 and 305 are misaligned, the toggle sensor mechanism 1100 will arc within the motion of the hinge, rather than pivot with the motion of the hinge.

Advantageously, embodiments of the present invention provide several advantages over controllers of the prior art. For example, the controller is intuitive and easy to use, and can be used with a wide variety of games.

Furthermore, as the left and right units (which form handgrips of the controller) are designed so that the thumb and fingers are able to grip the units without being affected throughout the range of motion. In clear contrast, external hinges generally disrupt the users grip as the controller is moved, which is clearly undesirable in gaming.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An articulated controller comprising:
    a first hand unit, for being held in one hand by the user;
    a second hand unit, for being simultaneously held in another hand by the user; and
    an at least one spacing link unit provided between the first and second hand units,
    wherein the at least one spacing link unit associates with the first hand unit and second hand unit about an articulable joint such that the first hand unit and second hand unit are configured to pivot around ends of the at least one spacing link unit, and
    wherein the articulable joint is at least partly enclosed by the first hand unit to enable the user to maintain a grip on the first hand unit without interference from the articulable joint, and wherein user input is provided to the controller through movement of the articulable joint.

2. The articulated controller of claim 1, wherein the first and second hand units are configured to pivot around a first axis, and at least one of the first and second hand units is configured to pivot around a second axis.

3. The articulated controller of claim 2, wherein the second axis is perpendicular to the first axis.

4. The articulated controller of claim 2, wherein the first and second hand units are configured to pivot around the first axis independently of pivoting around the second axis.

5. The articulated controller of claim 1, wherein the first and second hand units are configured to mimic an up-down motion, where the first and second hand units are raised or lowered relative to each other, such that an angle is varied between the first hand unit and the at least one spacing link unit, and between the second hand unit and the at least one spacing link unit.

6. The articulated controller of claim 1, wherein the controller is a gaming controller.

7. The articulated controller of claim 1, wherein the first hand unit is pivotally attached to the at least one spacing link unit, and the second hand unit is pivotally attached to the at least one spacing link unit.

8. The articulated controller of claim 1, wherein the controller includes an interface, for communicating signals of the controller to a system to be controlled.

9. The articulated controller of claim 8, wherein the interface is a wireless interface.

10. The articulated controller of claim 8, wherein the controller includes a sensor, coupled to the interface, the sensor configured to sense relative movement of the first and second hand units.

11. The articulated controller of claim 10, wherein the sensor is configured to sense relative movement of the first and second hand units by sensing a movement of the first hand unit with reference to the at least one spacing link unit.

12. The articulated controller of claim 1, wherein the at least one spacing link unit is configured to maintain the first and second hand units in a parallel arrangement.

13. The articulated controller of claim 1, wherein the at least one spacing link unit comprises first and second arms, pivotally coupled to the each of the left and right hand units, and wherein the first and second arms are parallel, of equal length, and symmetrically positioned on the first and second units to form a parallelogram with the first and second units.

14. The articulated controller of claim 1, wherein the controller includes one or more springs, configured to bias the articulable joint coupling into a normal state.

15. The articulated controller of claim 1, wherein the controller includes a joypad on an upper portion of a front thereof, which enables the user to input left, right up and down motions.

16. The articulated controller of claim 1, wherein the controller is substantially symmetrical.

17. The articulated controller of claim 1, wherein the controller is entirely handheld.

18. The articulated controller of claim 1, wherein a first signal component is generated according to pivoting around the first axis, and a second signal component is generated according to pivoting around the second axis.

* * * * *